Nov. 18, 1958    K. M. HOLLAND ET AL    2,860,740
SPLICED METAL FOIL HONEYCOMB PRODUCT AND
METHOD OF MAKING SAME
Filed July 27, 1953
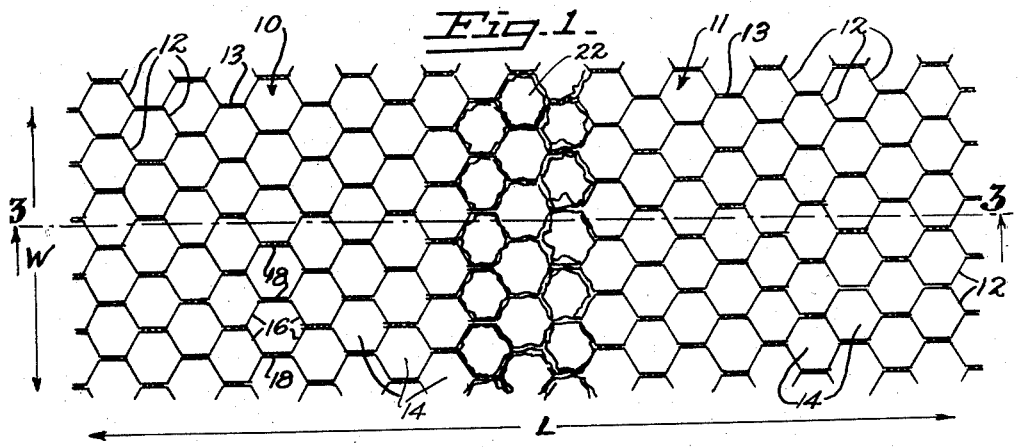
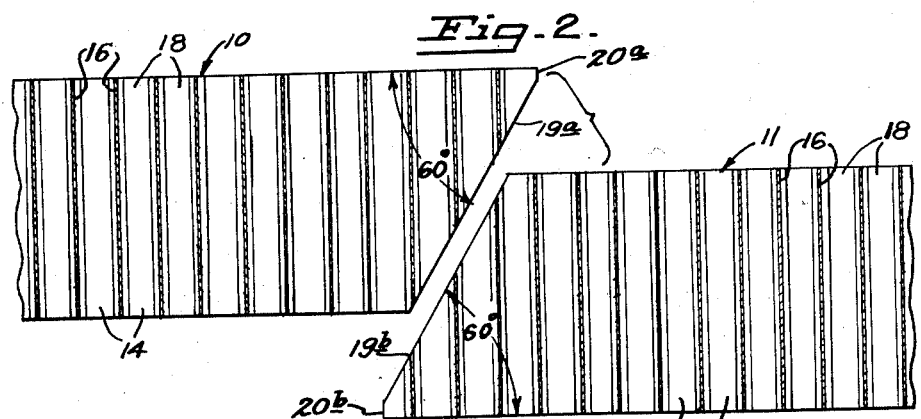
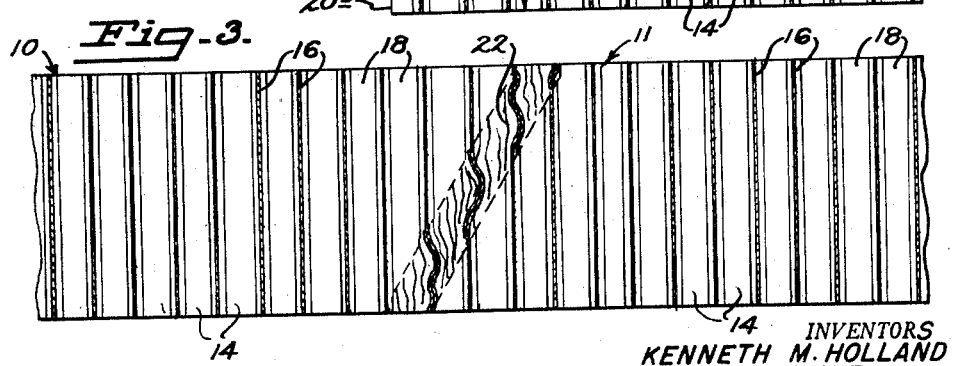
INVENTORS
KENNETH M. HOLLAND
EDWIN L. RULE
BY
Townsend, Townsend and Hoppe
ATTORNEYS

United States Patent Office 2,860,740
Patented Nov. 18, 1958

2,860,740

SPLICED METAL FOIL HONEYCOMB PRODUCT AND METHOD OF MAKING SAME

Kenneth M. Holland, Albany, and Edwin L. Rule, Hayward, Calif., assignors to Hexcel Products Inc., a corporation of California Application July 27, 1953, Serial No. 370,326

4 Claims. (Cl. 189—36)

This invention relates to a new honeycomb product and method of producing same. More particularly, this invention relates to spliced metal foil honeycomb product and a method of producing the same.

The particular embodiment of the product, which is illustrated in the drawings and which will be described hereinafter in more detail, comprises first and second sheets of metal foil honeycomb joined together in edge to edge relationship—the joined edges of said sheets being formed with complementary bevels and being spliced to one another with a plurality of cell edges of one sheet being imbedded within sheared contiguous areas of the second sheet and with the unsheared cell edges of the second sheet imbedded within sheared contiguous areas of the first sheet.

The method of producing the product which will be hereinafter described in more detail, comprises the steps of complementally beveling the adjacent edges of two metal foil honeycomb sheets to be joined, and after positioning the beveled edges of the two sheets in mutually overlying and partially overlapped position with respect to one another, physically compressing the two sheets thus positioned together under sufficient pressure to cause the contiguous cell edges of the sheets to mutually shear one another and mechanically splice together.

A principal object of the present invention is to provide a novel, practical and economical way of joining in edge to edge relationship two or more sheets of metal foil honeycomb such as, for example, aluminum foil honeycomb, to form, in effect, a unitary section of the material of practically any desired dimensions.

Other objects and advantages of the present invention will become apparent upon reading the following specifications and referring to the accompanying drawings in which similar characters of reference represent corresponding parts in each of the several views.

In the drawings:

Fig. 1 is a plan view of the spliced honeycomb product.

Fig. 2 is a fragmentary, longitudinal sectional view of two sheets of metal foil honeycomb pre-formed and positioned relative to one another for joinder.

Fig. 3 is a fragmentary, longitudinal sectional view taken on line 3—3 of Fig. 1.

As above noted, it is an object of the present invention to disclose a unique way of joining two or more sheets of metal foil honeycomb in edge to edge relationship. The reference numerals 10 and 11 of the drawings indicate generally two sections of metal foil honeycomb, such as aluminum foil honeycomb. In Figs. 1 and 3 these sections are shown as being spliced together in edge-to-edge relationship. In Fig. 2 the sheets 10 and 11 are shown positioned relative to one another prior to joinder. The honeycomb material disclosed in the drawings may be considered as representing aluminum foil honeycomb of more or less conventional construction. Each of the sections 10 and 11 comprise a plurality of corrugated webs 12, which are joined together at their nodes by suitable adhesive 13. It is observed that each of the individual hexagonal cell openings 14 of the honeycomb is defined by four single thickness walls 16, and two double thickness walls 18 where the webs 12 are bonded together in node-to-node relationship.

In the preferred practice of the present invention the respective marginal edges of the two sheets 10 and 11 of the metal foil honeycomb to be joined together are pre-formed with complementary bevels, as indicated at 19–a and 19–b respectively.

More specifically, the drawings disclose adjacent edges of the two sheets as each being chamfered or beveled at an angle of approximately 60° with respect to the face surfaces of the material. It is noted that the angle of bevel may be varied considerably, and in this regard we recommend, for example, that in splicing together aluminum foil honeycomb pieces which exceed one inch in thickness that a somewhat greater splice angle, approaching 70°, for instance, be employed.

Moreover, satisfactory results can be obtained by either forming the honeycomb pieces with complementary bevels extending the entire thickness of the material or the bevels may be formed so as to extend only part way through the thickness of the material. In this connection Fig. 2 of the drawings indicates the bevels extended approximately 9/10 the way through the honeycomb core thickness thereby defining the beveled faces 19–a and 19–b above noted, and truncated faces 20–a and 20–b which lie perpendicular to the face surfaces of the honeycomb core pieces. In splicing certain types of honeycomb pieces to one another it may be found desirable to extend the bevel surfaces through the entire thickness of the core, whereas in the splicing of other types of core best results may be found to obtain in extending the beveled surface one-half the distance, more or less, through the core thickness. Further explanation in this regard will be made hereinafter.

After the marginal edges of the core pieces to be joined have been formed with complementary bevels of desired characteristics the two pieces are positioned relative to one another in the general manner indicated in Fig. 2. More specifically, the pieces are initially positioned with the complementary beveled faces 19–a and 19–b in contiguous overlying relationship and with the outer edges of each piece, such as heretofore indicated at 20–a and 20–b, overlapping the flat face surface area of an adjacent piece. The distance or amount of overlap is also a factor which is subject to considerable variation. For example, the extent of overlap between the pieces will depend in some measure on whether the core pieces are to be spliced together in the direction of their "length" or in the direction of their "width." In this connection it is pointed out that the longitudinal or lengthwise direction of a given sheet of honeycomb (indicated by the reference line L in the drawings) may be considered as the direction in which the bonding lines 13 extend; whereas, the transverse or widthwise axis of a honeycomb sheet (indicated by the reference line W in the drawings) may be considered to extend in a direction perpendicular to the direction in which the said glue lines 13 extend. The present method can be employed to give good results in splicing honeycomb pieces together in either their longitudinal or transverse directions although the shear strength of honeycomb will be found to be generally greater in the direction of its length than its width. Comparatively speaking, therefore, it is also generally true that two pieces of honeycomb core of metal foil of the same gauge, cell size and thickness, spliced together in the direction of their length will inherently result in a splice having greater shear strength than a splice joining the same two pieces in their transverse or widthwise direction. In joining two honeycomb core pieces in the direction of their length (L direction) we recommend that the outer marginal edge of each piece be overlapped with respect to the face surface area of its adjacent piece a minimum distance of about one full cell length of the material. In splicing the pieces together in the direction of their width (W direction) we recommend that the extent of the overlap be somewhat greater and in excess of a one cell overlap. More specifically, we have found that in splicing honeycomb pieces in the direction of their width that it is generally practical to overlap the marginal edge of each piece with respect to its adjacent piece a minimum distance equal to the cell pitch (or nominal cell size) of the honeycomb pieces, multiplied by about 1.75 inches. Thus, for example, if the cell pitch or nominal cell size of the honeycomb core to be joined is ¼", for example, then the distance which each piece should overlap the other would be: ¼ x 1.75 (inches) = .44 inches (approximate) of overlap.

After the two sheets of honeycomb to be joined have been positioned relative to one another in the manner described above, the pieces are then forcefully compressed together to cause elements of the honeycomb core in each piece to cut into and mechanically imbed themselves within contiguous elements of the honeycomb core of the other piece, as indicated at 22, for example. More specifically, the two sheets of honeycomb, after they have been positioned relative to one another in the manner described in Fig. 2 of the drawings, for example, can be placed between the flat platens of a conventional press which can be operated to mechanically compress and force the sheets into uni-planarity, such as shown in Fig. 3. As above noted, the cell edges of each piece will, under compression, tend to cut into the contiguous cell edges of the other piece. It is evident that at any point of contact between contiguous cell edges of the two honeycomb sheets the cell edge which is more subject to shear failure will "give way" and fail under shearing action of the stronger and more rigid element of the other piece of honeycomb. Thus, for example, in practicing the invention it will generally follow that the double thickness cell walls of one sheet will, because of their greater rigidity and strength, shear into and imbed themselves within the single thickness walls of the other sheet. It is further pointed out that where two contiguous cell edges of the same or nearly the same strength and rigidity are brought into forceful contact with one another that either a mutual partial shearing of each edge will result, or that both cell edges will fail under pressure by bending or crumpling due to column failure of the material. However, it has been found that in practically every instance where honeycomb pieces are spliced together according to the invention that the mutual shearing and imbedding of the elements of one piece with respect to the elements of the other piece will be adequate to result in a relatively strong and satisfactory mechanical splice between the two pieces.

In some applications it is important or desirable to maintain the density of the spliced areas of honeycomb as low as possible. In such instances the pieces of honeycomb would not be overlapped more than necessary, or much beyond the more or less minimum amount of overlap recommended hereinabove. However, in instances where increase in density at spliced areas is not an important factor, it is frequently more expedient to increase the amount of overlap between the pieces. For example, in splicing together beveled pieces of relatively heavy gauge honeycomb material, it is usually more convenient to overlap the pieces to an extent whereby the innermost beveled edge of each piece overlies the face surface area of the other piece a short distance of perhaps about one cell length or thereabouts. Such increase overlap eliminates any practical danger of the two beveled faces of the honeycomb pieces engaging in such way as to cam one another apart when subjected to force of the press.

As suggested heretofore, the characteristics of the complementary bevels formed along the marginal edges of the honeycomb pieces to be spliced together are subject to considerable variation as evidenced by the fact, for example, that satisfactory results have been obtained in forming the bevels through the entire thickness of the honeycomb, or in some instances in forming truncated bevels.

In more detail, we have found it particularly advantageous to form truncated bevels in the splicing together of honeycomb made of extremely light or thin gauge metal foil such as .0014" gauge. The thin gauge material is more subject to column failure than the relatively heavier gauge metal foil. Moreover, column failure of the light gauge material will be particularly pronounced throughout the area as of least thickness of the honeycomb. Hence, if this type of material is formed with bevels throughout its entire thickness the extreme edge portions of the beveled surfaces (which are the areas of least thickness) will exhibit a rather pronounced tendency to fail by bending or crumpling when the pieces are compressed together. By forming truncated bevels the extreme edges of the material will still be of substantial thickness whereby the cell edges will exhibit more of a tendency to mutually cut and imbed themselves into one another rather than fail by crumpling or bending.

The forming of truncated bevels which extend only part way through the thickness of the material also reduces waste of honeycomb material. This is particularly true in the heavier gauge or heavier density honeycomb. In short, the chamfering off of only one corner edge of each honeycomb piece to be spliced to define a truncated bevel will result in the saving in the amount of material chamfered as compared to the alternative practice of chamfering through the entire thickness of the honeycomb piece.

We have also found that the strength of a splice between any two pieces of honeycomb joined together in accordance with the invention can be greatly enhanced by dipping or coating the spliced areas with a suitable liquid adhesive which can be dried or cured to provide a strong cementitious bond between the inner locked or spliced elements of the two sheets. Thus, for example, by dipping or otherwise coating the spliced joints of two pieces of honeycomb with a suitable liquid synthetic resin such as a vinyl phenolic or rubber base phenolic resin, and then advancing such material to its final cured stage, the spliced joint thus formed will generally be found to have as great a shear and compressive strength as the individual sheets of honeycomb spliced together.

Although the invention has been described in some detail by way of illustration and example for purpose of clarity and understanding, it is understood that certain changes and modifications may be practiced within the scope of the invention as limited only by the scope of the claims appended hereto.

We claim:

1. A product formed of metal foil honeycomb of the type defined by double thickness cell walls at points where adjacent corrugated webs are bonded to one another, node-to-node, and single thickness walls elsewhere, comprising: two sheets of said metal foil honeycomb spliced together in edge-to-edge relationship; the spliced edges of said sheets being formed with complementary bevels in cross section; the joined edges of said sheets being spliced together with a plurality of double thickness cell walls of one sheet imbedded within contiguous sheared single thickness cell walls of said second sheet and with a plurality of double thickness cell walls of said second sheet imbedded within contiguous sheared single thickness cell walls of said first sheet.

2. A metal foil honeycomb product comprising: first and second sheets of metal foil honeycomb joined together in edge-to-edge relationship; the joined edges of said sheets being formed with complementary bevels; the joined edges of said sheets being spliced together with a plurality of cell edges of one sheet embedded within sheared contiguous edges of said second sheet and with unsheared cell edges of said second sheet embedded within contiguous sheared edges of said first sheet, said spliced areas of said honeycomb sheets being intimately bonded together by an adhesive.

3. A method of splicing two sheets of metal foil honeycomb having cells with single and double thickness walls comprising the steps of: forming adjacent edges of the honeycomb sheets to be joined with truncated beveled edges; positioning the beveled edges of said sheets in overlying position relative to one another and with the truncated edge of each sheet overlapping the marginal face surface extremities of the other sheet a distance at lease equal to more than one cell pitch of the honeycomb pieces and whereby a substantial number of single thickness walls of each section are vertically aligned relative to a substantial number of double thickness walls of the other section; and then forcefully compressing together the overlying edges of the sections to cause the double thickness wall edges of each section to shear and embed themselves in the single walls of the other section.

4. A metal foil honeycomb product having cells with both single and double thickness walls comprising: first and second sheets of metal foil honeycomb joined together in edge to edge relationship; the joined edges of said sheets being formed with complementary bevels; the joined edges of said sheets being spliced together with a plurality of double thickness walls of one sheet embedded within sheared contiguous edges of single thickness walls of said second sheet and with unsheared double thickness walls of said second sheet embedded within contiguous sheared single thickness walls of said first sheet.

References Cited in the file of this patent

UNITED STATES PATENTS

| | | |
|---|---|---|
| Re. 957 | Titus et al. | May 1, 1860 |
| 409,641 | Jeffrey | Aug. 20, 1889 |
| 2,083,165 | Harrap | June 8, 1937 |
| 2,212,481 | Sendzimir | Aug. 20, 1940 |
| 2,304,718 | Swart | Dec. 8, 1942 |
| 2,498,831 | Veitch | Feb. 28, 1950 |
| 2,522,408 | Sowter | Sept. 12, 1950 |

FOREIGN PATENTS

| | | |
|---|---|---|
| 871,229 | Germany | Mar. 19, 1953 |